March 3, 1959 — C. C. BUCKELS — 2,875,914
ELECTRICAL OUTLET BOX
Filed Oct. 31, 1956
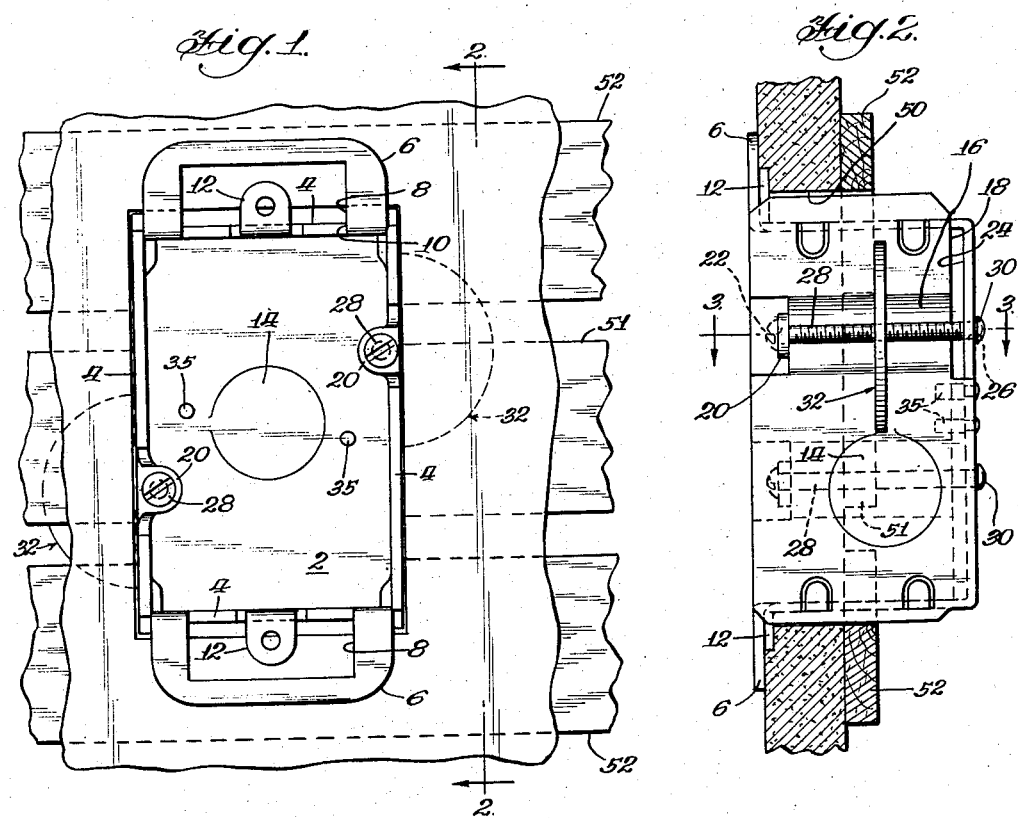
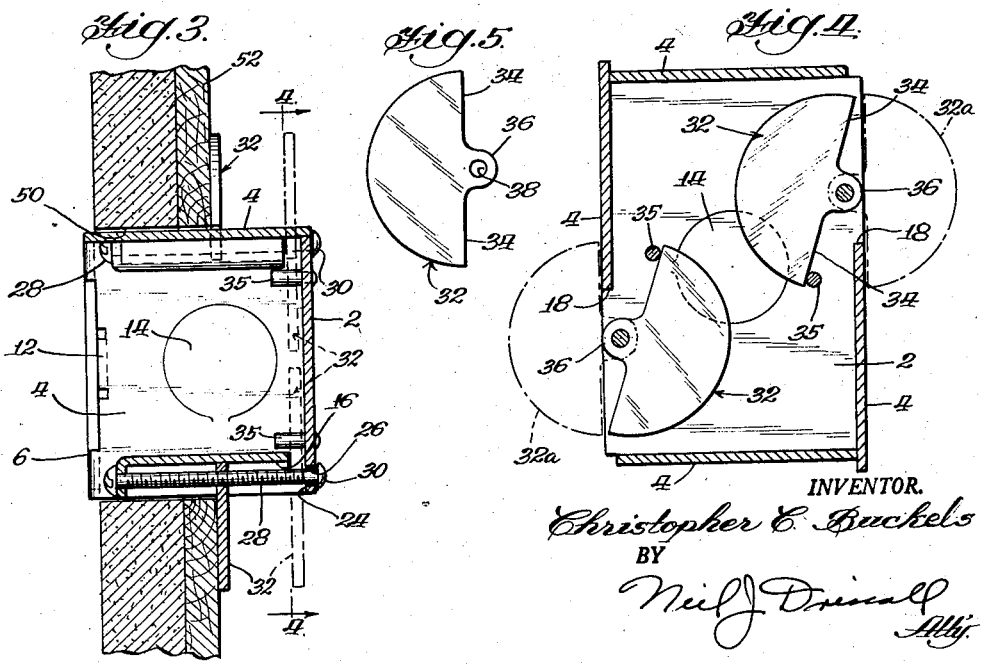
INVENTOR.
Christopher C. Buckels
BY
Neil J. Driscoll
Atty.

United States Patent Office 2,875,914
Patented Mar. 3, 1959

2,875,914

ELECTRICAL OUTLET BOX

Christopher C. Buckels, Chicago, Ill.

Application October 31, 1956, Serial No. 619,553

3 Claims. (Cl. 220—3.6)

The invention relates to an electrical outlet box and particularly to a novel mounting arrangement associated therewith.

It is well known in the art that a particular vexatious problem is presented to the electrican when he is required to install outlet boxes in buildings already constructed. The building occupant is usually most interested in a convenient location for the outlet without regard to wall members or other structure which could afford positive and firm support for the outlet box. To remedy this difficulty, many attempts have been made to provide an outlet box arrangement having associated therewith convenient means to readily and firmly secure the box in any location in the wall. To date, the various means provided to so secure the boxes have had inherent disadvantages associated therewith with the result that this problem has not been satisfactorily solved from the standpoint of positive and firm box mounting, convenience and ease of installation, and installation with a minimum expenditure of expensive electrician's time associated therewith.

Accordingly, it is a primary object of the invention to provide an outlet box of the type described having associated therewith means for quickly and positively mounting and demounting the outlet box in any convenient location on any wall and regardless of the thickness.

Particularly, the invention comprehends an outlet box having slots formed in certain side walls thereof, mounting members normally disposed internally of the box and located adjacent said slots, said mounting members being pivotally secured to screws which offer convenient structure for movably positioning the members completely externally of the box and thereafter to secure, by rotative movement of the screws, the box to the existing wall.

These and other novel features of the invention will be more particularly understood by referring to the following description and to the associated drawings, wherein:

Figure 1 is a front plan view of a mounted outlet box constructed in accordance with the invention, Figure 2 is a side elevational view of the box taken along line 2—2 of Figure 1, Figure 3 is a sectional view taken along line 3—3 of Figure 2 and illustrating the box in position in a wall, Figure 4 is a sectional view taken along line 4—4 of Figure 3 and showing the clamping members internally of the box, and Figure 5 is a detail view of the clamping member employed.

Describing the invention in detail and directing attention to the figures, it will be seen that the box comprises a back wall 2 having peripherially upstanding therefrom quadrantally arranged side walls 4, 4. In the illustrated embodiment, the box is of rectangular form suitable for mounting a single switch and accordingly certain of the side walls have a greater longitudinal dimension than other side walls. It is to be understood, however, that the invention may be applied to other geometric shapes, as for example, the invention may be applied to boxes that have been "ganged" to serve as a mounting for a multiplicity of switches or other electrical devices. Adjacent the open end of the box, certain of the side walls 4 have wing members 6 secured thereto, said wing members 6 being arranged to extend outwardly of the box and are preferably formed in a common plane. Portions of the members 6 may be cut out, as at 8, and the associated side wall 4 may be indented as at 10. The walls 4 may be provided with outwardly extending switch mounting lugs 12 which fall in a plane below and immediately adjacent the plane of the wing members 6. This depression or indented feature at 10 permits the switch to be mounted in the box without an unreasonable protrusion above the plane of the wing members 6 which could interfere with flush mounting of the cover plate (not shown) as is well understood by those skilled in the art. The walls of the box may also be provided with conventional knock outs 14 in convenient locations and for use during subsequent wire installation.

On certain of the side walls 4, preferably the walls 4 not having the members 6 associated therewith, vertical cavities 16 may be formed by appropriate indenture therein. Immediately below the cavities 16, the related side walls 4 may be thin slotted, as at 18, said slots being preferably located immediately adjacent the back wall 2 for reasons which will hereinafter be explained. A portion of each side wall at a point immediately above the related cavity 16 may be formed into an outwardly extending lug 20 having an aperture 22 formed therein, said lug delineating the upper extremity of the cavity 16. Portions of the back wall 2 immediately below the slots 18 are arranged to provide the lower limits thereof, as at 24, and to effectively define the lower limits of the cavities 16. These portions 24 of the back wall may be provided with apertures 26, said apertures 26 preferably being in vertical alignment with the apertures 22 in the lugs 20. Screws 28 may be disposed in the apertures 22 and 26 for journaled or rotative movement therein. It will be particularly noted that in this arrangement the screws are received within the cavities 16. The lower ends of screws 28 may be bossed or bent over, as at 30, to prevent same from escaping from their journaled connection to the box.

Clamping members 32 (illustrated in Figure 5), preferably of semi-circular form, and having co-planar or flat edge surfaces 34, 34, may be provided, said members having bosses 36 extending from and intermediate said surfaces 34. The bosses 36 are provided with threaded apertures 38 which threadably connect to the related screw 28. In normal position, the members 32 may be located internally of the box (Figure 4) and in such a manner that the bosses 36 extend through the slots 18 to make said threadable connection with the related screws 28. This construction will accommodate pivotal movement of the members 32 about the screws 28, through the slots 18 to a point whereat both clamping members are located entirely outboardly of the associated side walls 4. This position is most clearly illustrated in phantom at 32a in Figure 4. When the members 32 are located outboardly of the box, rotation of the associated screws 28 in any convenient manner, will cause movement of the members 32 in parallel relation to the axis of the screws 28.

Attention is specifically directed to Figure 4 wherein the location of the members 32 internally of the box is shown. This location of the members 32 permits easy manipulation thereof during installation. It will be noted that the back wall 2 is provided with stops or lugs 35 which extend above the inner surface thereof to engage a related surface 34 of the members 32 and position the members 32 so that the surfaces 34 are angularly related to the adjacent side walls 4 and one edge of each member 32 is immediately adjacent and slightly extending into the associated slot 18, but not outboardly thereof. This feature further speeds assembly of the box during manufacture thereof.

To install a box of this nature in any wall, it is first necessary to cut a hole in the wall slightly larger than the plan form of the box. It will be noted that in the preferred embodiment the plan form of the box is rectangular, thereby simplifying the cut out operation in view of the fact that irregular cut out is avoided. Thereafter, the box with the members 32 disposed internally thereof, may be inserted through the wall hole illustrated at 50 in Figures 2 and 3. As a result of this insertion, the wing members 6 are brought into abutting engagement with the outer surface of the wall. To facilitate this insertion, the clamping members may be urged, by rotation of the screws 28, to frictionally engage the slot limiting portion 24 of the back wall 2 to assure that the clamping members will be retained in position internally of the box. Once the box has been mounted to the wall, screw members 26 may be rotated by using a screw driver to first disengage the clamping members 32 and then to allow same to rotate outwardly through the slots 18 and into clamping position 32a entirely outboardly of the box side walls 4. It will be noted that the lugs 35 so position the members 32 that they will rotate outboardly and not lock up on the edge of the walls 4 that define the slots 18. Continued rotation of the screws 28 will draw the clamping members axially of the associated screws until such time as they engage the rear surfaces of the walls to firmly clamp the box to the wall between themselves and the wing members 6 as illustrated in Figures 1 to 3. Should it be desired to demount the box from the wall, the screws 28 are merely rotated in the opposite direction whereby the clamping members 32 are moved toward the back wall of the box disengaging themselves from the wall until they engage the back wall 2 whereupon continued rotation of the screws will cause the elements to pivot internally of the box through the slots 18 and into abutment with lugs 35 and further rotation will lock same in position internally of the box. The box may then be easily withdrawn from its rectangular hole in the wall.

It will be particularly noted that slots 18 are located immediately adjacent the back wall 2 whereby a minimum of interference between the members 32 and any wires that may be in the box after installation is incurred. This feature is of advantage in removing the box from the wall for additional installation or the like. This slot location also readily accommodates the box to walls of varying thickness. It will also be noted that the clamping members 32 when moved outwardly of the box are entirely disposed outboardly of the related side wall thereby avoiding the need for vertically elongated apertures to accommodate linear movement thereof. The fact that the screws 28 are journaled both above and below the related slot 18 permits positive guiding during vertical movement of the members 32 to assure proper clamping of the box into position in the wall. Additionally, the bearing in the aperture 26 below the slot prevents accidental disengagement of the clamping member from the screw while the box is located in the wall. It will further be noted that the flat surfaces 34 on the clamping members are arranged to first engage the walls 4 to limit outward rotation thereof and then to parallel the related side wall 4 on each side of the cavity 16 during screw induced movement of the clamping members to guide same vertically into the desired clamping position.

Referring again to Figure 1, it will be seen that a frequent installation of a box of this type on existing construction requires the severing of a centrally located lath 51 and only the partial severing of the laths 52 above and below the lath 51. The result thereof is that the lath 51 is now supported in a weak cantilever fashion in the wall. Any pressure on the lath in a direction perpendicular to the wall tends to result in cracking of the plaster overlay and in a loose support for the outlet box with mounting arrangements heretofore used. The opposed corner location of my clamping members 32 is designed to avoid this undesirable occurrence. It will be noted that in the box mounted position illustrated, the members 32 overlie several laths, that is, both the upper and lower laths 52 as well as the severed 51, whereby upon securing thereof they rigidly mount the box as well as afford additional support to the severed lath 51 and avoid the loose mounting mentioned.

Thus it will be seen that I have provided on outlet box and a novel mounting arrangement associated therewith having the advantages mentioned and that further affords easy, positive means for securing the box in any wall regardless of thickness (e. g., plaster or dry wall construction) and accomplishes same with a minimum expenditure of time and labor.

The invention as disclosed is by way of illustration and not limitation and may be subject to various modifications without departing from the spirit thereof or the scope of the appended claims.

I claim:

1. In an outlet box, a back wall, a side wall extending from the back wall and delineating an open end, a pair of wing members connected to the side wall adjacent the open end and on opposite sides of the box, said side wall having two narrow elongated slots therein on opposite sides of the box, said slots being located immediately adjacent said back wall and having the long axes thereof paralleling said back wall, said side wall having a pair of cavities formed therein extending inwardly of the box and perpendicular to the back wall, each cavity being located adjacent the respective slots, a pair of screws respectively mounted in the cavities outside said side wall, journals receiving the opposite ends of each screw whereby each screw is mounted for rotation on said box, locking means on the opposite ends of each screw to anchor to said screws against axial movement, clamping members normally located inside of the box and in abutting relation with the back wall, each of said clamping members having a journal portion extending through one of the respective slots and into threadable engagement with the adjacent screws, said clamping members being rotatable in response to rotation of the respective screws through the respective slots and into abutting relation with the outside of the side wall, whereby continued rotation of the respective screws will move the respective clamping members parallel to said side wall and toward said open end.

2. An outlet box according to claim 1, and including abutments projecting from the back wall internally of the box to engage the respective clamping members and limit movement thereof inside of the box.

3. An outlet box according to claim 2, wherein said box is rectangular, and the slots and their related clamping members are located adjacent opposed corners of the box.

References Cited in the file of this patent

UNITED STATES PATENTS

| | | |
|---|---|---|
| 1,161,046 | Guett | Nov. 23, 1915 |
| 2,031,861 | Simek | Feb. 25, 1936 |
| 2,272,846 | Lingstrom | Feb. 10, 1942 |
| 2,320,400 | Bedell | June 1, 1943 |
| 2,413,139 | Fredriksen | Dec. 24, 1946 |
| 2,423,757 | Dedge | July 8, 1947 |
| 2,776,774 | Valelunga | Jan. 8, 1957 |